United States Patent

Thelin

[11] Patent Number: 5,816,755
[45] Date of Patent: Oct. 6, 1998

[54] METHOD FOR MACHINING COMPOSITES

[75] Inventor: Anders Thelin, Vallingby, Sweden

[73] Assignee: Sandvik AB, Sandviken, Sweden

[21] Appl. No.: 746,158

[22] Filed: Nov. 6, 1996

Related U.S. Application Data

[63] Continuation of Ser. No. 419,288, Apr. 10, 1995, abandoned, Continuation of Ser. No. 63,696, May 20, 1993, abandoned.

[30] Foreign Application Priority Data

Sep. 15, 1992 [SE] Sweden ................................... 9202658

[51] Int. Cl.$^6$ ............................... B23C 9/00; B23B 35/00
[52] U.S. Cl. ............................................. 409/132; 408/1 R
[58] Field of Search ..................................... 409/131, 132, 409/66, 74, 64; 29/557, 558; 408/22, 27, 230, 224, 228, 145, 11 R; 451/259

[56] References Cited

U.S. PATENT DOCUMENTS

| | | |
|---|---|---|
| 3,739,461 | 6/1973 | Cupler, II . |
| 4,190,386 | 2/1980 | Brabetz et al. . |
| 4,338,050 | 7/1982 | Ozer et al. . |
| 4,352,610 | 10/1982 | Yankovoy et al. . |
| 4,470,733 | 9/1984 | Marques, Jr. ........................... 408/230 |
| 4,475,850 | 10/1984 | Penoza et al. . |
| 4,480,952 | 11/1984 | Jeremias ................................. 408/224 |
| 4,655,648 | 4/1987 | Hellbergh . |
| 4,680,897 | 7/1987 | Daniels et al. . |
| 4,696,711 | 9/1987 | Greszczuk . |
| 4,720,218 | 1/1988 | DeFries et al. . |
| 4,757,645 | 7/1988 | Ozer et al. . |
| 4,798,024 | 1/1989 | Grimm . |
| 4,810,136 | 3/1989 | Paige . |
| 5,000,630 | 3/1991 | Riley et al. . |
| 5,221,163 | 6/1993 | Nishimura . |
| 5,354,155 | 10/1994 | Adams ..................................... 408/145 |

FOREIGN PATENT DOCUMENTS

| | | |
|---|---|---|
| 2516830 | 5/1983 | France . |
| 2313630 | 11/1973 | Germany . |
| 3314049 A1 | 10/1984 | Germany . |
| 3508520 A1 | 9/1986 | Germany . |
| 62-57811 | 3/1987 | Japan . |
| 62-114806 | 5/1987 | Japan . |
| 1004011 A | 3/1983 | U.S.S.R. . |
| 2048135 | 4/1979 | United Kingdom . |
| WO 93/23192 | 11/1993 | WIPO . |
| WO 94/11142 | 5/1994 | WIPO . |

OTHER PUBLICATIONS

"Machining Glass–Reinforced Plastics with Cemented Carbide Tools", American Machinist, Mar. 29, 1945, pp. 91–93.

*Primary Examiner*—William R. Briggs
*Attorney, Agent, or Firm*—Burns. Doane, Swecker & Mathis, L.L.P.

[57] ABSTRACT

There is now provided a method of machining and shaping a through opening in a fiber-reinforced composite material starting from a preformed hole. At least one rotation symmetrical milling body with a substantially smaller diameter than that of the preformed hole is placed in that hole and the opening is machined and shaped by the milling body partly rotating around its own axis, partly by a translational movement relative to the edge of the opening. According to the method, the fiber-reinforced material is oriented in such a way that the axis of rotation of the milling body is essentially perpendicular to the longitudinal direction of the fibers at the edge of the opening. The size and/or form of the finished opening differs significantly from that of the preformed hole. The radial spread of the damages and/or the defects define a lower limit for the amount of material removed.

7 Claims, 2 Drawing Sheets

METHOD FOR MACHINING COMPOSITES

This application is a continuation of application Ser. No. 08/419,288 filed Apr. 10, 1995, now abandoned which, in turn, is a continuation of application Ser. No. 08/063,696 filed May 20, 1993, now abandoned.

BACKGROUND OF THE INVENTION

The present invention relates to a method of machining and shaping a through opening in a fiber-reinforced composite material.

Swedish patent application 9201420-8 discloses a method of machining and shaping a through opening with damage-free edges in a fiber-reinforced composite material with high precision by placing a rotationally symmetrical grinding body in a preformed hole with the composite material being oriented in such a way that the axis of rotation of the grinding body is essentially perpendicular to the longitudinal direction of the fibers at the edge of the opening. The opening is machined and shaped by the grinding body partly rotating around its own axis, partly performing a revolving motion relatively to the edge of the opening. Grinding, however, is a slow process with several limitations to its effective commercial use in such a method.

OBJECTS AND SUMMARY OF THE INVENTION

It is an object of this invention to avoid or alleviate the problems of the prior art.

It is further an object of this invention to provide an improved method of machining and shaping a through opening in a fiber-reinforced composite material.

The present invention provides a method of machining and shaping a through opening in a fiber-reinforced composite material starting from a preformed hole comprising placing at least one rotationally symmetrical milling body with substantially smaller diameter than that of the preformed hole in said hole and machining and shaping the desired opening with the milling body partly rotating around its own axis and partly by performing a translational movement relative to the edge of the opening, the fiber-reinforced material in the composite being oriented so that the axis of rotation of the milling body is essentially perpendicular to the longitudinal direction of the fibers at the edge of the opening, the size and/or geometry of the finished opening differing significantly from that of the preformed hole, the radial spread of the damages/defects arising from the pre-forming of said hole defining a lower limit for the amount of material removed.

BRIEF DESCRIPTION OF THE DRAWINGS

The invention is described closer in the following under reference to the accompanying drawings in which one embodiment is shown by way of example. This embodiment can however be modified within the scope of the claims.

In FIGS. 1A, 1B, 2A and 2B, 1 is the fiber-reinforced laminate, 2 is the preformed hole, 3 is the milling body, 5 is the axis of rotation of the milling body, and 6 is the damages and/or defects. In FIG. 2A, 7 is the finished opening.

In FIGS. 3 and 4, 10 is the milling body, 11 is an insert, 12 is the central hole in an insert 11, 13 is the side surface of an insert 11, 14 is the clearance face of an insert 11, and 15 is the edge surface of an insert 11.

DETAILED DESCRIPTION OF THE PREFERRED EMBODIMENTS OF THE INVENTION

It has now turned out that by using a milling body rather than a grinding tool, a significantly higher rate of cutting, less heat generation as well as better machining economy can be obtained.

Figure 1A:
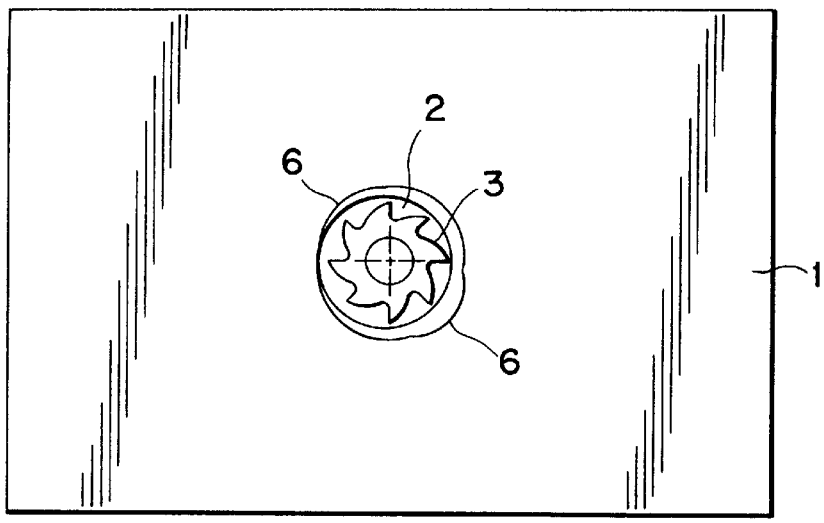
FIGS. 1A, 1B, 2A and 2B illustrate how a through opening is shaped in a fiber-reinforced composite plate using a rotationally symmetrical milling cutter body according to the present invention.
Figure 1B:
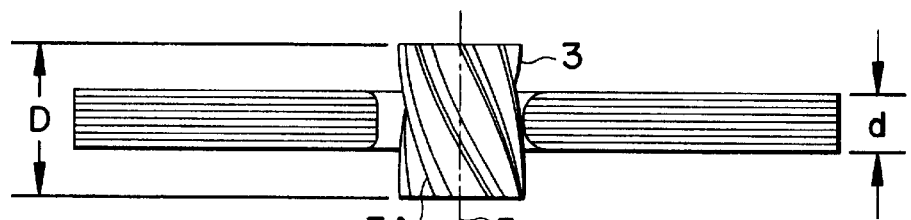
Figure 2A:
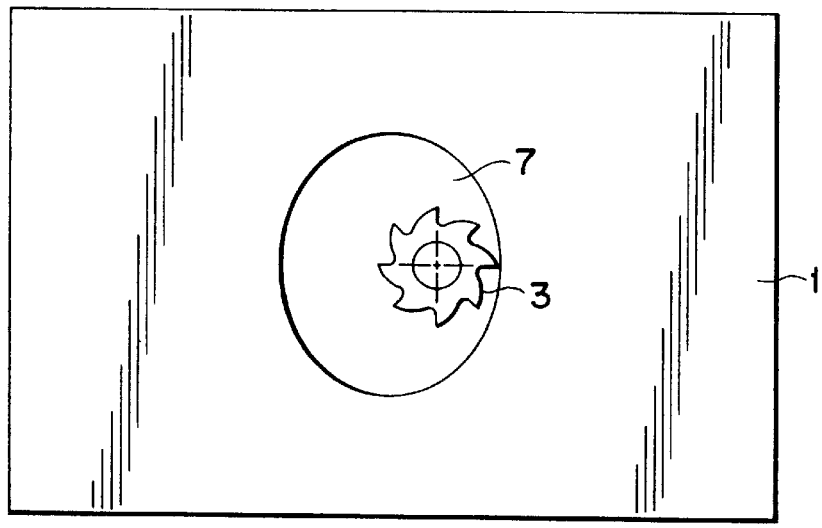
Figure 2B:
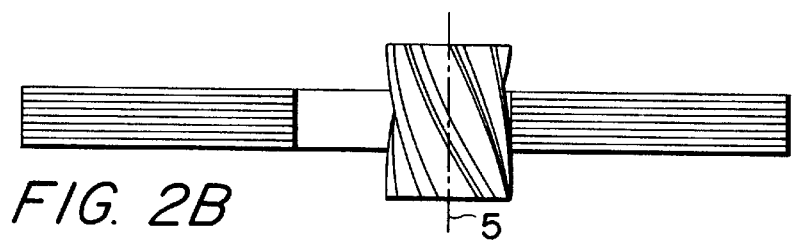

According to the present invention, there is now provided an improved method of machining and shaping a through opening in a fiber-reinforced composite material. The method is described for the case as shown in FIGS. 1A, 1B, 2A and 2B where the material is present in form of a plane plate 1, a laminate composed of a number of lamellas containing continuous fiber reinforcements, whereby the lamellas are piled on top of each other. The fibers lie oriented in planes parallel to the plane of the laminate, whereby the fiber directions are 0°, 90°, 45° and -45°. An opening 2 in the laminate is shaped first by, for example, drilling. Damages and/or other defects 6 frequently arise at the edge of the opening. In the preformed hole 2, a rotationally symmetrical milling body 3 having spiral cutting edges 3A is placed. A distance D between opposite ends of each cutting edge 3A in a direction parallel to the axis of rotation is greater than a depth d of the hole 2. Also, each cutting edge extends around the axis less than 360 degrees within the hole. That is, the portion of each cutting edge extending within the depth d of the hole 2 extends circumferentially for less than 360 degrees, as can be seen in FIG. 1B for example. The laminate is oriented in such a way that the axis of rotation of the milling body 5 is perpendicular to the longitudinal direction of the fibers in the plate 1, i.e., perpendicular to the plane of the laminate. The opening 2 is machined by the milling body 3 partly rotating around its own axis 5 and partly by performing a translational movement relative to the edge of the opening 2 so that the damage and other defects 6 resulting from the shaping of the opening 2 are removed. The size and/or form of the finished opening 7 differs substantially from that of the preformed hole 2. While the finished opening can have any desired shape and size, machining with the milling body is conducted to at least remove the damage or other defects 6.

The milling body is suitably a so-called long edge milling cutter of high speed steel or solid cemented carbide or a metal-base with brazed or indexable, removable inserts of cemented carbide, titanium-based carbonitride alloy (so-called cermet) or ceramics. Such inserts are well-known in the art and inserts of these types can be used. The milling cutter (if high speed steel or cemented carbide) or the inserts are preferably coated with at least one thin layer of wear resistant material such as TiC, TiN and/or $Al_2O_3$ applied by the known CVD- and PVD-methods as known in the art. A thin layer of diamond is a particularly suitable coating. The total thickness of the coated layer is $20\mu m$, preferably $2$–$10\mu m$.

Alternatively, the milling cutter contains one or more diamond bodies or said inserts are diamond impregnated, e.g., according to U.S. patent application Ser. No. 07/811,527, incorporated herein by reference.

Particularly appropriate for use in the process of the present invention is the so-called drilling mill whereby the whole operation can be performed with only one tool. As shown in phantom in FIG. 3, the milling body 10 can comprise a drilling mill 10.

Figure 3:
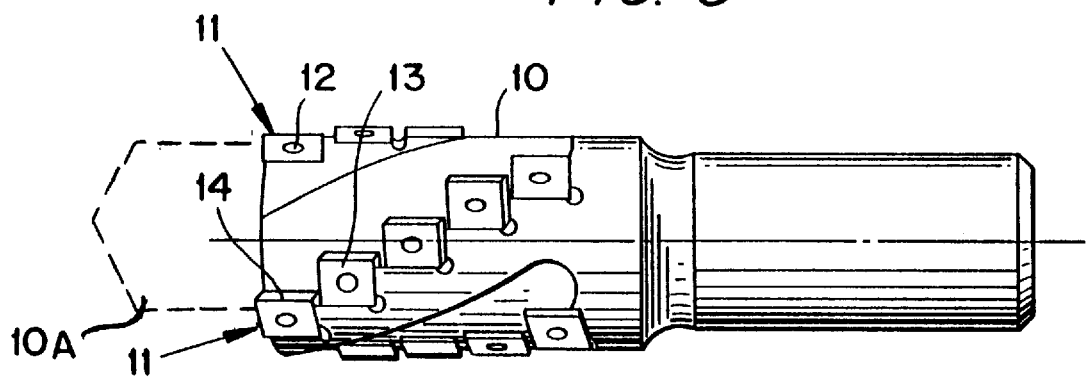
FIG. 3 shows a side view of a milling cutter provided with inserts useful in the present invention.
Figure 4:
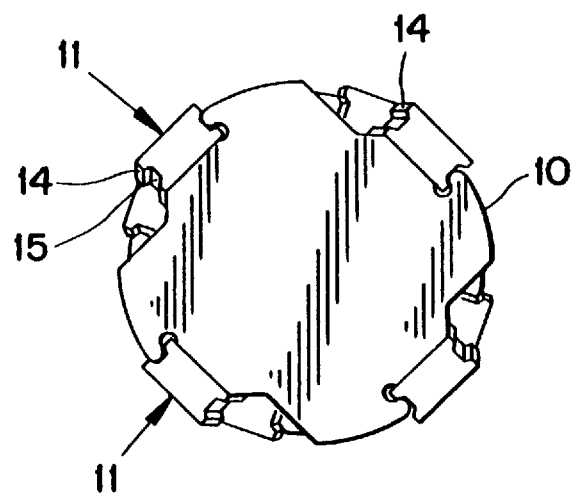
FIG. 4 shows a top view of the mill in FIG. 3.

For making larger openings, a milling cutter with the design shown in FIGS. 3 and 4 is particularly suitable. This milling cutter is a milling body 10 equipped with removable inserts 11. The inserts 11 can be provided with a central hole 12 through the insert, wherein a threaded locking pin (not shown) is inserted to clamp the insert 11. When machining, the milling cutter rotates counterclockwise in FIG. 4 whereby the side surface 13 of the insert 11 forms the clearance face of the cutting edge 14 and the edge surface 15 forms the edge of the insert chip face. A number of inserts 11 in the shown embodiment are arranged in a spiral path in the longitudinal direction of the milling body 10. Four such spiral paths are uniformly distributed around the circumference of the milling body 10.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of machining and shaping an opening in a fiber-reinforced composite, said method comprising the steps of:

A) forming an initial hole in the composite by rotating a machining tool having a body defining a longitudinal axis of rotation, and a plurality of cutting edges disposed symmetrically on an outer periphery of said body, extending generally spirally about said axis of rotation, a distance between opposite ends of each spiral cutting edge in a direction parallel to said axis of rotation being greater than the depth of said initial hole, each of said cutting edges extending around said axis of rotation less than 360 degrees within said initial hole, said axis of rotation oriented substantially perpendicular to a longitudinal direction of reinforcement fibers disposed at an edge of said initial hole, said edge of said initial opening having damages or defects possessing a radial spread; thereafter B) moving said body along said edge of said initial hole while rotating said body about said axis of rotation, with said axis of rotation offset radially from a center axis of said initial hole and with said cutting edges in contact with said edge of said initial hole so as to enlarge said initial hole into a finished opening; and C) performing step B to remove an amount of said composite wherein a lower limit of said removed amount is defined by said radial spread of said damages or defects.

2. The method according to claim 1 wherein each of the cutting edges extends continuously between said ends thereof.

3. The method according to claim 1 wherein each of the cutting edges is defined by a plurality of spaced apart cutting inserts arranged in a generally spiral path.

4. The method according to claim 3 wherein the inserts are formed of cemented carbide.

5. The method according to claim 3 wherein the inserts are formed of a ceramic.

6. The method according to claim 3 wherein the inserts are coated with diamond.

7. The method according to claim 3 wherein the inserts are indexable.

* * * * *